Patented July 22, 1941

2,250,049

UNITED STATES PATENT OFFICE 2,250,049

MIXED TRIARYL THIOPHOSPHATES

Clarence L. Moyle, Midland, Mich., assignor to The Dow Chemical Company, Midland, Mich., a corporation of Michigan No Drawing. Application December 19, 1938, Serial No. 246,667

8 Claims. (Cl. 260—461)

This invention concerns certain new mixed triaryl thiophosphates useful as plasticizing agents for a wide variety of synthetic plastic materials.

It has been found that certain aromatic thiophosphates are useful as plasticizing and modifying agents in the preparation of various synthetic plastic compositions, for example, compositions comprising cellulose ethers, such as ethyl cellulose, benzyl cellulose, etc.; cellulose esters, such as cellulose acetate and nitrocellulose; synthetic rubber; etc. The symmetrical triaryl thiophosphates, e. g. triphenyl thiophosphate, as well as the known mixed triaryl thiophosphates, e. g. di-p-tolyl mono-phenyl thiophosphate, however, are crystalline solids, and this property detracts somewhat from their use as plasticizing agents since they have a tendency to crystallize and to exude to the surface of the compositions into which they have been incorporated, thereby causing blushing or blooming of the plasticized composition.

I have now found that the mixed triaryl thiophosphates containing two different aromatic radicals, at least one of which contains nine or more carbon atoms, are in most instances high-boiling viscous liquids which are excellent plasticizing agents and which, because of their liquid state, do not cause blushing or blooming in the composition into which they are incorporated. These new products are also useful as fire retardants.

The invention, then, concerns the new mixed triaryl thiophosphates having the general formula

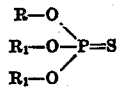

wherein R and R₁ represent different aromatic radicals, at least one of which contains nine or more carbon atoms.

The new mixed triaryl thiophosphates having the above formula are conveniently prepared by reacting the corresponding triaryl phosphite with sulfur. Thus, di-phenyl mono-p-xenyl thiophosphate, for example, is prepared by reaction between di-phenyl mono-p-xenyl phosphite and sulfur, di-o-chlorphenyl mono-p-tertiarybutylphenyl thiophosphate is prepared from di-o-chlorphenyl mono-p-tertiarybutylphenyl phosphite and sulfur, etc.

The mixed triaryl phosphites employed as starting materials in preparing the new thiophosphates may be prepared by first reacting a phosphorus trihalide, e. g. phosphorus trichloride or phosphorus tribromide, with approximately two molecular equivalents of a phenol, e. g. phenol, p-tertiarybutylphenol, alpha-naphthol, mixed cresols, carvacrol, p-phenylphenol, o-ethylphenol, o-cyclohexylphenol, 2.4-dimethylphenol, p-isopropylphenol, thymol, p-tertiary-octylphenol, 3.5-diethylphenol, etc., to form a diaryl phosphorous acid mono-halide, and thereafter reacting such intermediate product with approximately one molecular equivalent of a different phenol to prepare the desired mixed triaryl phosphite. It is necessary, of course, that at least one of the phenolic reactants employed contains nine or more carbon atoms in order that the final thiophosphate product may fall within the present class of mixed triaryl thiophosphates. If desired, the order in which the reactions are carried out may be changed, that is, the phosphorus trihalide may first be reacted with approximately one molecular equivalent of a phenol to prepare a mono-aryl phosphorous acid di-halide and the latter may then be reacted with approximately two molecular equivalents of a different phenol to form the mixed triaryl phosphite product.

The above reactions for formation of the triaryl phosphite intermediate product are carried out by heating a mixture of the reactants to a temperature at which hydrogen halide is evolved, i. e. between about 30° C. and about 200° C. If desired, a catalyst, such as metallic calcium, magnesium, or aluminum, or a chloride of magnesium, aluminum, or iron, may be employed. The reaction product consists largely of the desired mixed triaryl phosphite, but may contain minor proportions of other mixed triaryl phosphites as well as symmetrical triaryl phosphites. Such mixed product is usually reacted directly with sulfur as hereinafter described to prepare the desired mixed triaryl thiophosphate product, but, if desired, the individual phosphites may first be separated from the mixed product by fractional distillation.

The reaction for the formation of the mixed triaryl thiophosphate is carried out by heating the corresponding phosphite with approximately one molecular equivalent of powdered sulfur at a temperature between about 150° C. and about 250° C. The time required for completion of the reaction is usually from 1 to 3 hours, although a somewhat longer time may be required depending upon the particular reactants and the temperature employed. The product usually consists almost entirely of the desired mixed triaryl thiophosphate and may be employed directly as a plasticizing agent, fire retardant, etc. If necessary, it may be purified by fractional distillation under vacuum.

The following examples will illustrate several ways in which the principle of the invention has been applied but are not to be construed as limiting the same:

Example 1

A mixture of 688 grams (6.0 mols) of phosphorus trichloride and 300 grams (2.0 mols) of carvacrol was heated at approximately 45°–55° C. for approximately 4 hours, hydrogen chloride being evolved during the reaction. When the reaction was complete, the excess phosphorus trichloride was distilled off, 378 grams being recovered. The crude carvacryl phosphorous acid dichloride product was then cooled to approximately 30° C. and 400 grams (4.25 mols) of phenol was added. The temperature was gradually raised to approximately 150° C. over a period of about 10 hours, i. e. until the evolution of hydrogen chloride gas had ceased, after which time 64 grams (2.0 mols) of powdered sulfur was added gradually over a period of 6 hours while maintaining the mixture at a temperature of approximately 150° to 210° C. The crude diphenyl mono-carvacryl thiophosphate product obtained was dissolved in o-dichlorbenzene and was washed with dilute aqueous sodium hydroxide and with water. The product was then fractionally distilled under vacuum whereby there was obtained 680 grams of purified di-phenyl mono-carvacryl thiophosphate, a viscous colorless liquid distilling at approximately 240° to 248° C. under 7.5 millimeters pressure and having a specific gravity of about 1.155 at 25/25° C. Di-phenyl mono-carvacryl thiophosphate has the formula

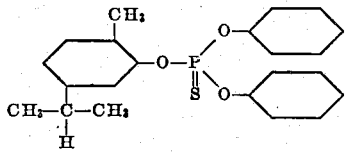

Example 2

A mixture of 1650 grams (12.0 mols) of phosphorus trichloride and 825 grams (5.2 mols) of p-tertiarybutylphenol was heated at 15° to 41° C. for 1½ hours as in Example 1. Excess phosphorus trichloride was distilled from the reaction mixture and 780 grams (8.3 mols) of phenol was added. The temperature was then gradually raised to 164° C. over a period of 9 hours. 873 grams (2.4 mols) of the resulting crude di-phenyl mono-p-tertiarybutlyphenyl phosphite was then heated at 175° to 210° C. for 1½ hours during which time 64 grams (2.0 mols) of powdered sulfur was added in 15 gram portions. The mixture was cooled to 150° C., stirred with 8 grams of copper bronze powder and 2 grams of sodium carbonate at this temperature for ½ hour, and was fractionally distilled under vacuum. There was obtained di-phenyl mono-p-tertiarybutylphenyl thiophosphate, a colorless viscous liquid distilling at approximately 252° to 267° C. under 7 millimeters pressure, and having a specific gravity of about 1.155 at 25/25° C. Di-phenyl mono-p-tertiarybutylphenyl thiophosphate has the formula

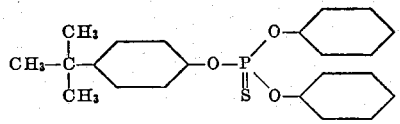

Example 3

778 grams of crude di-phenyl mono-o-xenyl phosphite, prepared by reacting phosphorus trichloride successively with o-phenylphenol and phenol as in Example 1, was heated at a temperature of approximately 175° to 215° C. for 1¾ hours during which time 64 grams of powdered sulfur was added in 15 gram portions. The mixture was stirred with 15 grams of copper bronze powder for ½ hour at 155° C. and was then fractionally distilled under vacuum. Di-phenyl mono-o-xenyl thiophosphate was obtained as a pale yellow liquid distilling at approximately 275° to 281° C. under 6 millimeters pressure and having a specific gravity of about 1.260 at 25/25° C. Di-phenyl mono-o-xenyl thiophosphate has the formula

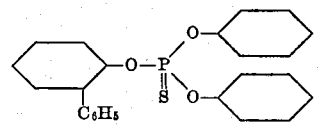

The new mixed triaryl thiophosphates may also be prepared by successively reacting a phosphorus thiohalide, e. g. phosphorus thiochloride or phosphorus thiobromide, with two different phenols in a manner analogous to that described above for the preparation of mixed triaryl phosphites. The following example is illustrative of such procedure:

Example 4

A mixture of 678 grams (4.0 mols) of phosphorus thiochloride and 1360 grams (8.0 mols) of o-phenylphenol was heated at a temperature of approximately 90° to 170° C. for 20 hours, during which time hydrogen chloride gas was evolved from the mixture. The mixture was cooled to room temperature, 376 grams (4.0 mols) of phenol was added, and the temperature was gradually raised to approximately 230° C. over a period of 13 hours. The crude product obtained was dissolved in o-dichlorbenzene, washed with dilute aqueous sodium hydroxide and water, and was fractionally distilled under vacuum. There was obtained di-o-xenyl mono-phenyl thiophosphate, a pale yellow viscous liquid distilling at approximately 320° to 330° C. under 10 millimeters pressure and having the formula

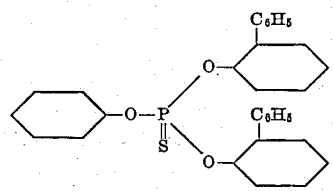

Other mixed triaryl thiophosphates of the present class which have been prepared by procedure similar to that set forth in the above examples are set forth in the following table:

Table

| Compound | | Appearance | Distillation range, °C. at 7.5 mm. | Specific gravity at 25/25° C. |
|---|---|---|---|---|
| Name | Formula | | | |
| Di-o-chlorphenyl mono-carvacryl thiophosphate. | 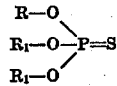 | Colorless viscous liquid. | 274-282 | 1.261 |
| Di-p-tertiarybutylphenyl mono-o-xenyl thiophosphate. | 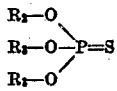 | Very viscous yellow liquid. | 316-330 | |
| Di-(m,p)-tolyl mono-o-cyclohexylphenyl thiophosphate. | 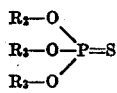 | Pale yellow viscous liquid. | 254-260 at 6 mm | 1.180 |
| Di-o-cylcohexylphenyl mono-(m,p)-tolyl thiophosphate. | 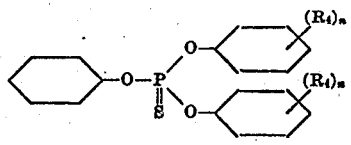 | Very viscous pale-yellow liquid. | 304-320 | 1.144 |

The phenolic reactants employed in preparing mixed triaryl thiophosphates of the present class may contain any of the neutral substituents, such as halogen, aryl, alkyl, or cycloalkyl substituents, which are non-reactive with the phosphorus trihalide or the phosphorus thiohalide under the reaction conditions employed, in which case correspondingly substituted triaryl thiophosphates will be obtained. Certain of such substituted triaryl thiophosphates have been described in the foregoing examples and table. Other thiophosphates of this type are: di-p-tertiarybutylphenyl mono-naphthyl thiophosphate, di-phenyl mono-p-xenyl thiophosphate, di-p-tolyl mono-p-tertiaryoctylphenyl thiophosphate, di-o-cyclohexylphenyl mono-2.4-dibromphenyl thiophosphate, di-o-xenyl mono-p-tertiarybutyl-o-tolyl thiophosphate, di-naphthyl mono-p-ethylphenyl thiophosphate, di-o-isopropylphenyl mono-2.4-dibromphenyl thiophosphate, di-m-cyclohexylphenyl mono-p-amylphenyl thiophosphate, di-p-tolyl mono-4-chloro-2-phenyl-phenyl thiophosphate, di-phenyl mono-4-tertiarybutylphenyl-2-phenyl-phenyl thiophosphate, etc.

Other modes of applying the principle of my invention may be employed instead of those explained, change being made as regards the method herein disclosed or the materials employed, provided the product stated by any of the following claims be obtained.

I therefore particularly point out and distinctly claim as my invention:

1. A mixed triaryl thiophosphate having the general formula $$\begin{array}{c} R-O \\ R_1-O-P=S \\ R_1-O \end{array}$$

wherein R and R₁ represent different aromatic radicals, at least one of which contains at least 9 carbon atoms.

2. A mixed triaryl thiophosphate having the general formula $$\begin{array}{c} R_2-O \\ R_3-O-P=S \\ R_3-O \end{array}$$

wherein R₂ and R₃ represent different aromatic radicals selected from the class consisting of phenyl, halo-phenyl, alkyl-phenyl, xenyl, and cycloalkyl-phenyl groups, at least one of which radicals contains at least 9 carbon atoms.

3. A liquid mixed triaryl thiophosphate having the general formula $$\begin{array}{c} R_2-O \\ R_3-O-P=S \\ R_2-O \end{array}$$

wherein R₂ and R₃ represent different aromatic radicals selected from the class consisting of phenyl, halo-phenyl, alkyl-phenyl, xenyl, and cycloalkyl-phenyl groups, at least one of which radicals contains at least 9 carbon atoms.

4. A mixed triaryl thiophosphate having the general formula

[structural formula with $(R_4)_n$ substituents]

wherein R₄ represents an alkyl group containing at least 3 carbon atoms, and $n$ represents an integer not greater than 2.

5. A mixed triaryl thiophosphate having the general formula

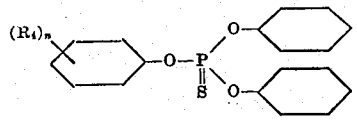

wherein $R_4$ represents an alkyl group containing at least 3 carbon atoms, and $n$ represents an integer not greater than 2.

6. A mixed triaryl thiophosphate having the general formula

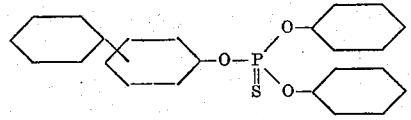

7. Di-phenyl mono-o-xenyl thiophosphate, a pale yellow viscous liquid distilling at approximately 275°–281° C. under 6 millimeters pressure and having a specific gravity of about 1.260 at 25/25° C. and the formula

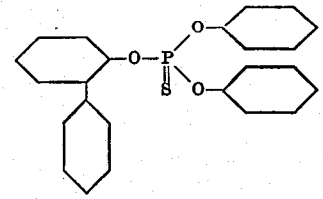

8. Di-phenyl mono-p-tertiarybutylphenyl thiophosphate, a colorless viscous liquid distilling at approximately 252°–267° C. under 7 millimeters pressure and having a specific gravity of about 1.155 at 25/25° C. and the formula

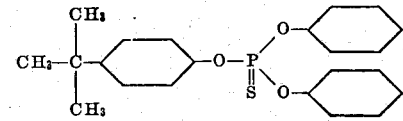

CLARENCE L. MOYLE.